No. 731,425. PATENTED JUNE 23, 1903.
C. T. BENSON.
ROTARY ENGINE.
APPLICATION FILED NOV. 1, 1902.
NO MODEL.
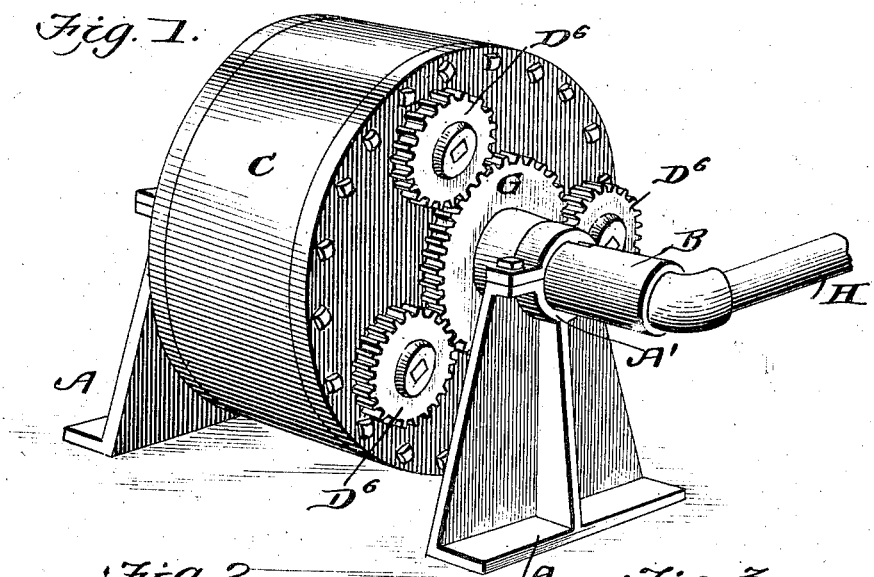
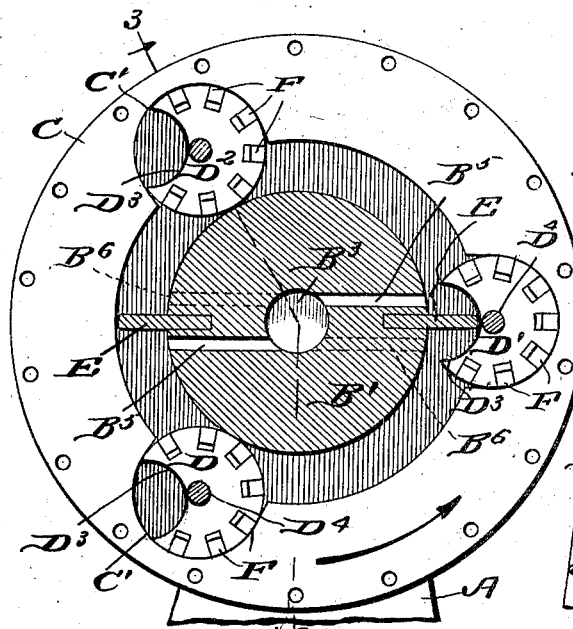
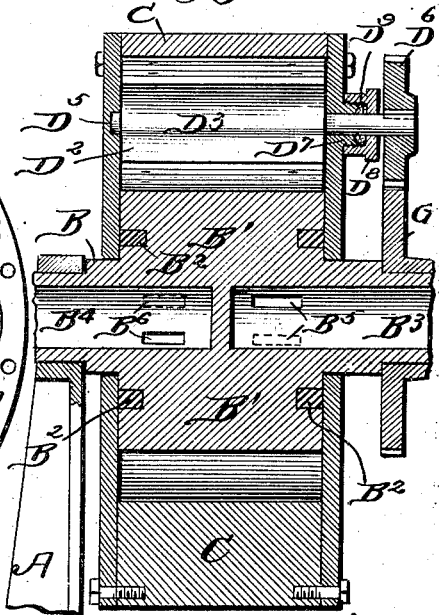
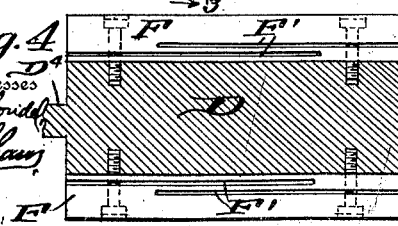
Witnesses
Inventor
C. T. Benson
By
Attorneys No. 731,425.

Patented June 23, 1903.

UNITED STATES PATENT OFFICE.

CHARLES THORVALD BENSON, OF CHICAGO, ILLINOIS, ASSIGNOR OF ONE-FOURTH TO BENJAMIN E. BENSON, OF CHICAGO, ILLINOIS.

ROTARY ENGINE.

SPECIFICATION forming part of Letters Patent No. 731,425, dated June 23, 1903.

Application filed November 1, 1902. Serial No. 129,753. (No model.)

*To all whom it may concern:*

Be it known that I, CHARLES THORVALD BENSON, a citizen of the United States, residing at Chicago, in the county of Cook and State of Illinois, have invented a new and useful Rotary Engine, of which the following is a specification.

My invention is an improvement in rotary engines, the object being to produce an engine of this type which shall be automatic in its operation and simple in construction, having very few parts, and therefore not likely to get out of order and not depending on springs for its valve action. My improvement differs from the usual type of rotary engines, however, in the fact that the valves and cylinders rotate, while the part usually termed the "piston" and which is the part driven by the steam in the ordinary engine is stationary.

In the accompanying drawings, Figure 1 is a perspective view of my device, showing gears for operating the valves. Fig. 2 is a view showing the cylinder and valves in elevation and the hub and piston in section. Fig. 3 is a sectional view on about the irregular line 3 3 of Fig. 2. Fig. 4 is a section through one of the valves, the packing being shown in elevation. Fig. 5 is a perspective view of the packing.

In the construction of my engine I employ a suitable base A, having a bearing A' formed in its upper portion. This base may of course be constructed in any desired manner. Supported in these bearings is a hollow non-revoluble shaft B, having a hub portion B'. Revolubly mounted on this shaft is a cylinder C, its ends fitting closely against the ends of the hub, packing-rings $B^2$, carried by the hub, pressing against the inner face of the cylinder. Journaled in the cylinder are three cylindrical valves D D' $D^2$, which are adapted to bear against the inner periphery of the cylinder and against the circumferential face of the hub. Each of these valves has a semicircular groove $D^3$ extending longitudinally the length of the valve. Two rectangular plates E are firmly secured to opposite sides of the hub and project to the walls of the cylinder. These plates correspond to the piston of the usual rotary engine. The walls of the cylinder are of considerable thickness and are recessed at C' to accommodate the valves. These valves are revolubly mounted on the shafts $D^4$, journaled at one end in one end of the cylinder, as at $D^5$, and having the other end projecting through the opposite end of the cylinder, and a gear $D^6$ is carried by the outer end of each shaft $D^4$. Where each of these shafts pass through the end of the cylinder an annular shoulder $D^7$ is formed and exteriorly threaded, and a cap $D^8$, interiorly threaded, fits on each shoulder, the head of the cap being perforated to permit passage of the shaft. Suitable packing $D^9$ is held around the shaft between the cap and shoulder. The valves are of such diameter that they practically fill the recesses C' when in the position of valve D' in Fig. 2. In order that the valves may accurately fit the recesses, strips of brass F are inlaid in the periphery of the valve, extending the length of the valves, and are secured in place by countersunk screws. To give these plates sufficient elasticity to serve as a packing, they are slotted from each end, as at F', the slots being in different planes and each extending beyond the other.

A large stationary gear G is mounted on the end shaft B adjacent the end of the cylinder carrying the valve-gears, and the gears $D^6$ mesh with and travel around the gear G as the cylinder turns, the gears $D^6$ turning in the same direction as the cylinder.

The shaft B has been described as hollow and is in reality a section of the steam-pipe, the steam-passage $B^3$ extending approximately to the center of the hub, where a non-perforate partition $B^7$ separates it from the exhaust-passage $B^4$, which is similar to the passage $B^3$ and which serves as an inlet-passage when the engine is reversed. Two passages extend laterally from each of the passages $B^3$ $B^4$, and those leading from $B^3$ are designated $B^5$, and those from $B^4$ are marked $B^6$. A steam-supply pipe H is suitably connected to the shaft B, and it is understood, of course, that a similar pipe is connected to the opposite end of the shaft through which the engine normally exhausts, but that steam can be admitted to the engine from either side.

The operation of my engine is as follows: Assuming that the parts are in the position shown in Fig. 2 and that the cylinder is to revolve in the direction of the arrow, steam entering via the pipe H, passage B³, and passage B⁵ will fill the space between the plate E and the valve D and also between the rear of the valve D and the other plate E. These valves acting as pistons or abutments will be forced away from the plates in the direction of the arrow, thus rotating the cylinder. The valves being rigid upon their shafts will also be rotated as the gears D⁶ will travel on and engage the gear G, and as this gear is stationary the valves will rotate also in the direction of the arrow. At the commencement of the revolution there will be no steam in front of valves D and D². When valve D reaches the first plate E, it will have turned to the position of D' and the slot will permit it to pass the plate E, the steam which had been acting on the valve D exhausting through the first passage B⁶ that the valve passes. The operation of all the valves is practically alike, and a smooth and continuous rotary movement is given the cylinder A. No springs are required to restore parts to a normal position, and the rotation of the valves being dependent on the rotation of the cylinder there is no danger of their acting too soon or too late. It is also understood that the gears D⁶ bear such a proportion to the gear G and the valves are of such diameter that the slots C' will always be presented to the plates E. It is also obvious that to reverse the engine it is necessary to pass the steam into the engine from the opposite side, exhausting through H, and it is further understood that power may be transmitted from the revolving cylinder in any desired manner, either by belting running from same or by a gear formed on its periphery.

It is understood that any means for governing the engine may be adopted.

Having thus fully described my invention, what I claim as new, and desire to secure by Letters Patent, is—

1. A rotary engine comprising a hollow stationary shaft, a cylinder revolubly mounted on said shaft, said cylinder having recesses formed in its inner face, cylindrical, recessed valves revolubly mounted within the recesses of the cylinders, plates extending from the shaft to the inner wall of the cylinder, and means for admitting and exhausting steam on each side of the plates.

2. In a rotary engine, the combination with a hollow stationary shaft having a transverse partition therein and passage-ways on each side of the partition extending to the periphery of the shaft, a cylinder revolubly mounted on said shaft, plates extending from the shaft to the walls of the cylinder, cylindrical valves adapted to act as abutments and to pass the plates, means for rotating said valves, and means for admitting steam into the hollow shaft.

3. In a rotary engine, the combination with a hollow stationary shaft having a transverse partition therein and passage-ways on each side of the partition extending to the periphery of the shaft, a cylinder revolubly mounted on said shaft and having semicircular recesses formed in its inner periphery, oppositely-positioned plates extending from the shaft to the inner face of the cylinder, cylindrical valves mounted in said cylinder, said valves having a groove formed longitudinally thereon and adapted to rotate in the semicircular recesses and to pass the ends of the plates, means for admitting steam to the cylinder, and means for rotating the valves when the cylinder revolves.

4. In combination with a suitable stationary shaft having a hub, a cylinder revolubly mounted thereon and inclosing the hub having recesses formed on its inner face, plates diametrically opposite each other extending from the hub to the inner face of the cylinder, revoluble shafts within the cylinder adjacent the recesses and projecting from one end of the cylinder, cylindrically-shaped valves having a groove extending their entire length mounted thereon within the cylinder, a large stationary gear-wheel mounted on the stationary shaft, smaller gears carried on the outer ends of the revoluble shaft and adapted to mesh with the stationary gear, and means for admitting and exhausting steam to and from the cylinder.

CHARLES THORVALD BENSON.

Witnesses:
BENJAMIN E. BENSON,
CHARLES PARSONS.